May 24, 1955   B. RONAY   2,708,793
GAUGING DEVICE
Filed July 24, 1951

INVENTOR
BELA RONAY
BY
ATTORNEYS

United States Patent Office 2,708,793
Patented May 24, 1955

2,708,793

GAUGING DEVICE

Bela Ronay, Glen Burnie, Md.

Application July 24, 1951, Serial No. 238,358

7 Claims. (Cl. 33—169)

(Granted under Title 35, U. S. Code (1952), sec. 266)

The invention described herein may be manufactured and used by or for the Government of the United States of America for governmental purposes without the payment of any royalties thereon or therefor.

This invention relates in general to welding and in particular to shaping devices for forming a welding backing at the end of a tubular member to be welded.

In my copending application, S. N. 238,357, filed July 24, 1951, entitled Welding Joint and Backing Therefor, now Patent No. 2,623,148, issued December 23, 1952, there is described a new welding technique particularly suited to butt welding of tubular members wherein a moldable refractory backing is placed on each of the tubular ends to be joined to serve several purposes: first, as a spacer to hold the ends a preselected distance apart during welding; secondly, to prevent the undue constriction of the pipe cross-section at the joint due to excess melting of the tubular wall; and thirdly, to form a bead at the root of the weld for better fusion in that critical region. Before the welding process, the moldable backing is applied to the tubular ends and then formed to the desired shape.

Accordingly it is an object of the present invention to provide a device for shaping of the welding backing.

Another object of the present invention is to provide a jig device for shaping a backing for butt welding of tubular members to provide an internal bead at the joint.

Other and further objects and features of the present invention will become apparent from a consideration of the following detailed description and accompanying drawings.

Figure 1:
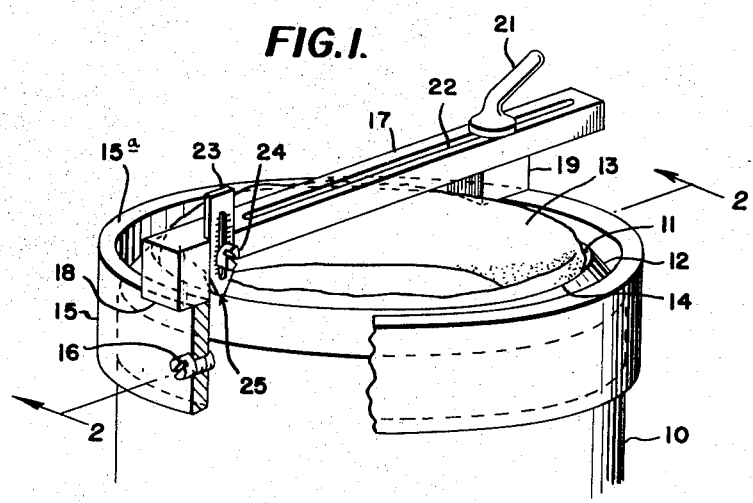
Fig. 1 is a perspective view, partly cut away, of a tubular member having a jig device at an end of the member for shaping the moldable backing inside the end.
Figure 2:
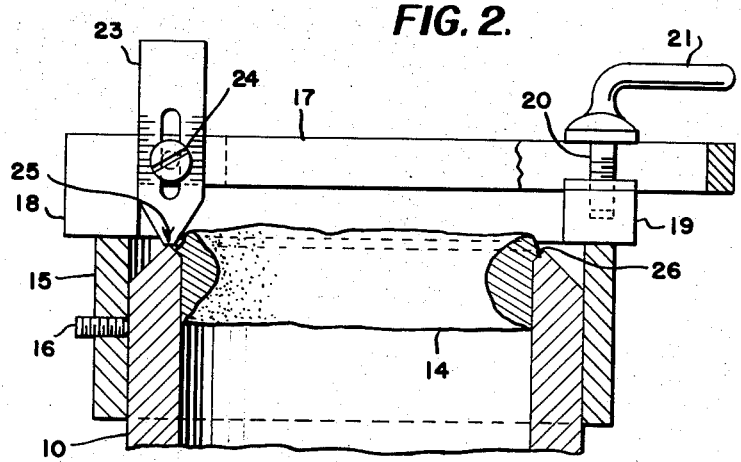
Fig. 2 is a sectional view substantially on the line 2—2 of Fig. 1.
Figure 3:
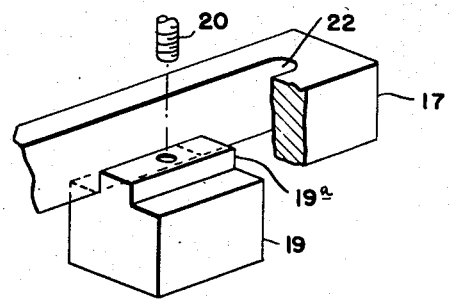

Fig. 3 is a view of a detail of the apparatus. With particular reference now to Figs. 1, 2, and 3 of the drawing, apparatus embodying the features of the present invention is shown as it would be used, mounted on the end of a tubular member 10. Member 10 is prepared as described in the previously identified copending application, that is, the end has an outer beveled portion 11, an inner beveled portion 12, and an irregular shaped coating or backing 13 of refractory material. The beveled portions 11 and 12 come together at the end of the pipe producing a feather edge 14.

The backing 13 as shown in Figs. 1 and 2 is somewhat irregular in shape, and is applied with enough material to extend beyond the end of the tubular member 10 by an amount in excess of that desired which may be about 1/32" or 1/16". The excess provides leeway for finishing off the end of the backing.

The backing preferably is composed of a metallurgically inert refractory such as refractory molding sand, alundum, or silica glass together with a plastic binder such as an acetone base thermoplastic, or "Duco" cement. In preparing the material for the backing the thermoplastic is added to the refractory in sufficient quantities to render the mixture of a putty-like consistency. Typically the quantities would be 90–95% silica sand and 5–10% binder. It is after this backing has hardened that the teachings of the present invention are normally applied to bring the end of the backing 13 to a uniform planar surface parallel to the plane of the feather edge 14, but projecting therebeyond a small distance, as for example by approximately 3/64". It should be understood however that the teachings of the present invention may be applied at least in part before the backing has solidified completely.

Normally it is considered that apparatus of the present invention will be used as a guide for an operation on the hardened backing such as filing or grinding by means of which the backing will be finished to the desired condition. It is not beyond reason, however, for the apparatus to be used as a guide in an operation on the backing such as molding, before it solidifies completely.

The apparatus of the present invention includes a shaping gauge sleeve 15 of suitable material such as steel or the like which has an inner diameter slightly larger than the outside diameter of the tubular member 10, and an end or face 15a.

The sleeve 15 is provided with a set screw 16 or other means whereby it may be rigidly held in place on the member 10. The thickness and length of sleeve 15 are immaterial, it only being necessary that this member have adequate strength to prevent deformation in use. It is generally desirable however, that sleeve 15 should have significant length, for example, an inch or more, so that it can be firmly secured to the member 10 without undue rocking. In this respect, one or more additional set-screws can be placed in the sleeve 15 angularly spaced from the set-screw 16 in order to provide additional stability. Preferably, the shape of the sleeve 15 is geometrically similar to that of the tubular member 10. In the specific embodiment being described, both are cylindrical and circular in cross-section.

A leveling and measuring bar 17 is provided for determining the position of the sleeve 15 on the member 10. The bar 17 has an end protrusion 18 with a flat undersurface adapted to rest on the flat annular face 15a at the end of the sleeve 15; and a block 19 is associated with the other end of the bar 17, the block 19 having a flat lower surface also adapted to rest on the face 15a of the sleeve 15, as indicated in Fig. 1. The lower surfaces of the protrusion 18 and the block 19 are preferably in a common plane which can be considered a reference plane for measuring purposes. In order to permit a single bar 17 to be used with a plurality of sleeves 15 of various diameters for tubular members 10 of different diameters, the block 19 is slidable along the bar 17. To this end the block 19 has an integral protrusion 19a and a threaded hole that receives a screw 20 operated by a hand lever 21. The bar 17 is provided with an elongated slot 22 which slidably receives the protrusion 19a of the block 19, with the screw 20 passing through the slot. By loosening and tightening of the hand lever 21, the block 19 can be fastened in any predetermined position along the slot 22 of the bar 17 in an obvious manner, the protrusion 19a on the block preventing twisting of the block in the slot.

Fixed to the side of bar 17, near its integral end protrusion 18, is a distance gauge 23 which is held in adjustable position by a screw 24 that screws into a mating hole in a vertical side of the bar 17.

Gauge 23 has a lower edge 25 that is adapted to contact the feather edge 14 of the tubular member 10. A suitable scale is provided on the gauge 23 accurately to indicate the distance of the lower edge 25 from the reference plane including the lower surfaces of the protrusion 18 and the block 19.

In operation, the leveling and measuring bar 17 is first adjusted by positioning the block 19 thereon to correspond to the diameter of the particular sleeve 15 being used. The gauge 23 is also adjusted so that its lower edge 25 is in a predetermined position with respect to the reference plane that contains the bottom surfaces of the protrusion 18 and the block 19. This adjustment may be such as to place the edge 25 in the reference plane or at some small distance below it as shown for example in Fig. 2, so that it is, in effect, an extension on the bar 17.

With the leveling and measuring bar 17 properly adjusted, the sleeve 15 is initially loosely held on the end of the tubular member 10. The leveling bar 17 is placed on the face 15a of the protruding end of the sleeve 15, in the position indicated in Fig. 1. The sleeve 15 is then adjusted to proper position on the end of the tubular member 10 with the help of the bar 17 which can be turned on the face 15a of the sleeve 15 while it rests thereon. The sleeve 15 is adjusted until the edge 25 of the gauge 23 secured to the bar 17 contacts substantially all points of the feather edge 14 when the bar 17 is turned on the face 15a of the sleeve 15. In this proper position, the sleeve 15 is securely fastened to the tubular member 10 by means of the set-screws provided. The leveling bar can then be removed and the uneven protruding edge of the backing 13 trimmed to be level with the plane of the face 15a of the bar 15. Preferably, the face 15a is flat, and its plane is perpendicular to the axis of the sleeve 15.

Preferably, for the reasons described in the aforesaid co-pending application, the gauge 23 is so set that its edge 25 protrudes below the reference plane of the protrusion 18 and block 19 a distance equal to half the separation desired between the feather edges 14 of two tubular end members 10 that are set up for welding. With this adjustment, it is evident that the annular face 15a of the sleeve 15 will be above the feather edge 14, a distance which is half the desired separation. The bar 17 can then be removed, if desired.

Using the projecting end of the sleeve 15 as a measuring guide, the backing material 13 is shaped or filed down so that the end thereof lies in the plane of the face 15a of the sleeve. Finished-surfacing of the backing material can be accomplished by any appropriate method desired, as for example by filing with a file which rests on the face 15a of the sleeve 15. If the backing is shaped while still plastic, the sleeve 15 may be employed to position a molding plane or tool thereon, thereby assuring that the finished end of the backing 13 will be at a predetermined distance, axially, from the end of the tubular member 10.

The portion of the backing near the inner bevel 11 of the tubular member 10 is cut back to a smaller outer diameter than the inside diameter of the tubular member to form a notched edge or groove therewith as indicated at 26 in Fig. 2. This can be done in any suitable manner, and a preliminary cut can be made before the backing 13 is leveled off. When two tubular ends prepared in this manner are brought together, the metallic ends of the tubes are held apart by the abutting backings and an inner pocket is formed into which weld metal can penetrate to form an inside bead on the tube, said bead having a rigidly controlled size, as described in the aforesaid application.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What is claimed is:

1. Apparatus for gauging the projection of an inside backing beyond the end of a tubular member comprising, a cylindrical shaping gauge sleeve having an inner diameter adapted to fit the tubular member and at least one annular face perpendicular to the longitudinal axis of the sleeve, measurement means engaging said face and having gauge means for setting the position of the gauge sleeve with respect to the end of the tubular member, and locking means for holding said gauge sleeve in a desired position on the tubular member.

2. Apparatus for gauging the projection of an inside backing beyond the end of a tubular member comprising, a shaping gauge sleeve having an inner diameter adapted to fit on the outside of the tubular member, a measurement bar extending across the sleeve over the end of the tubular member, an extension on said measurement bar for contacting the end of the tubular member, and locking means for holding said gauge sleeve in position where the measurement bar contacts the sleeve and said extension contacts the end of the tubular member.

3. Apparatus for gauging the projection of an inside welding backing beyond the end of a tubular member to be joined to a similar member by butt welding comprising, a cylindrical shaping gauge sleeve having an inner diameter adapted to fit on the outside of the tubular member and at least one annular face perpendicular to the longitudinal axis of the cylinder, a measurement bar extending across the sleeve over the end of the tubular member, a protrusion at an end of said measurement bar and a block at the other end of said measuring bar contacting the end of the tubular member, a gauge on said measuring bar at an end thereof between said block and protrusion, said gauge extending axially of said sleeve, locking means holding said gauge sleeve in position with said block and protrusion contacting said sleeve.

4. Apparatus as defined in claim 3 but further characterized by said bar and said block having fastening means for adjustably fastening said block along said bar.

5. Apparatus as defined in claim 4 but further characterized by said bar having a slot lengthwise therein and said fastening means comprises a screw fastener device passing through said slot and threaded to said block.

6. A leveler and measuring bar of a type described comprising an elongated slotted portion having a protruding end, a support block, fastening means adjustably fastening said block to said slotted portion, said fastening means comprising a hand lever having a threaded shaft extending vertically through said slotted portion, a threaded opening in said support block for receiving said threaded shaft whereby said block is adapted to be rigidly clamped to said bar at any position along the length of said slotted portion, said block and protruding end having bottom surfaces forming a reference plane for measurement purposes, and an adjustable gauge along a side of said bar having an edge adjustably positionable with respect to its distance from said reference plane.

7. A leveler and measuring bar of a type described comprising an elongated slotted portion having a protruding end, a support block, fastening means adjustably fastening said block to said slotted portion, said block and protruding end having bottom surfaces forming a reference plane for measurement purposes, a movable distance gauge vertically mounted on a side of said bar adjacent said protruding end, said gauge comprising a flat plate having a vertically extending slot therein and a plurality of graduations on each side of said slot, and a screw extending through said slot and into said bar for adjusting a lower edge of said plate relative to said reference plane.

References Cited in the file of this patent

UNITED STATES PATENTS

| | | |
|---|---|---|
| 1,216,879 | Stupillo | Feb. 20, 1917 |
| 1,441,715 | Rudersdorf | Jan. 9, 1923 |
| 2,303,651 | Mason | Dec. 1, 1942 |